United States Patent [19]

Meeks

[11] Patent Number: 5,072,507
[45] Date of Patent: Dec. 17, 1991

[54] DIE CHANGEOVER APPARATUS FOR BOX BLANK CUTTING MACHINE

[75] Inventor: William R. Meeks, Lawrence, Kans.

[73] Assignee: The Lawrence Paper Company, Lawrence, Kans.

[21] Appl. No.: 605,741

[22] Filed: Oct. 30, 1990

[51] Int. Cl.$^5$ .......................... B31B 1/14; B23Q 3/155
[52] U.S. Cl. ........................................ 29/568; 83/563; 83/564; 83/698; 493/61; 493/355; 493/477
[58] Field of Search ................. 83/700, 699, 698, 532, 83/651, 652, 563, 564; 72/481, 482; 493/354, 355, 477, 61; 29/568

[56] References Cited

U.S. PATENT DOCUMENTS

| | | | |
|---|---|---|---|
| 3,212,430 | 10/1965 | Clements | 83/563 X |
| 4,078,461 | 3/1978 | Ohta | 83/564 X |
| 4,706,532 | 11/1987 | Hashimoto | 83/700 X |

*Primary Examiner*—Mark Rosenbaum
*Assistant Examiner*—Kenneth E. Peterson
*Attorney, Agent, or Firm*—Hovey, Williams, Timmons & Collins

[57] ABSTRACT

An improved box blank die cutting machine (20) is provided which includes die changeover apparatus (32) permitting the machine die structure (28) to be rapidly changed without the necessity for completely removing the die frame (26) from the machine (20). The changeover apparatus (32) includes die-supporting elements (156, 158) designed to support the die frame (26) as it is shifted rearwardly towards the output end (46) of the machine (20). Moreover, the elements (158) include selectively extensible pins (184a, 184b) which are received within corresponding die frame apertures (108, 110), so that the die frame (26) may be pivoted to an upright die changeover position. Limit stops (188, 190) are also provided for limiting the pivoting movement of the die frame (26), and for stabilizing the die frame (26) in its upright position.

11 Claims, 8 Drawing Sheets

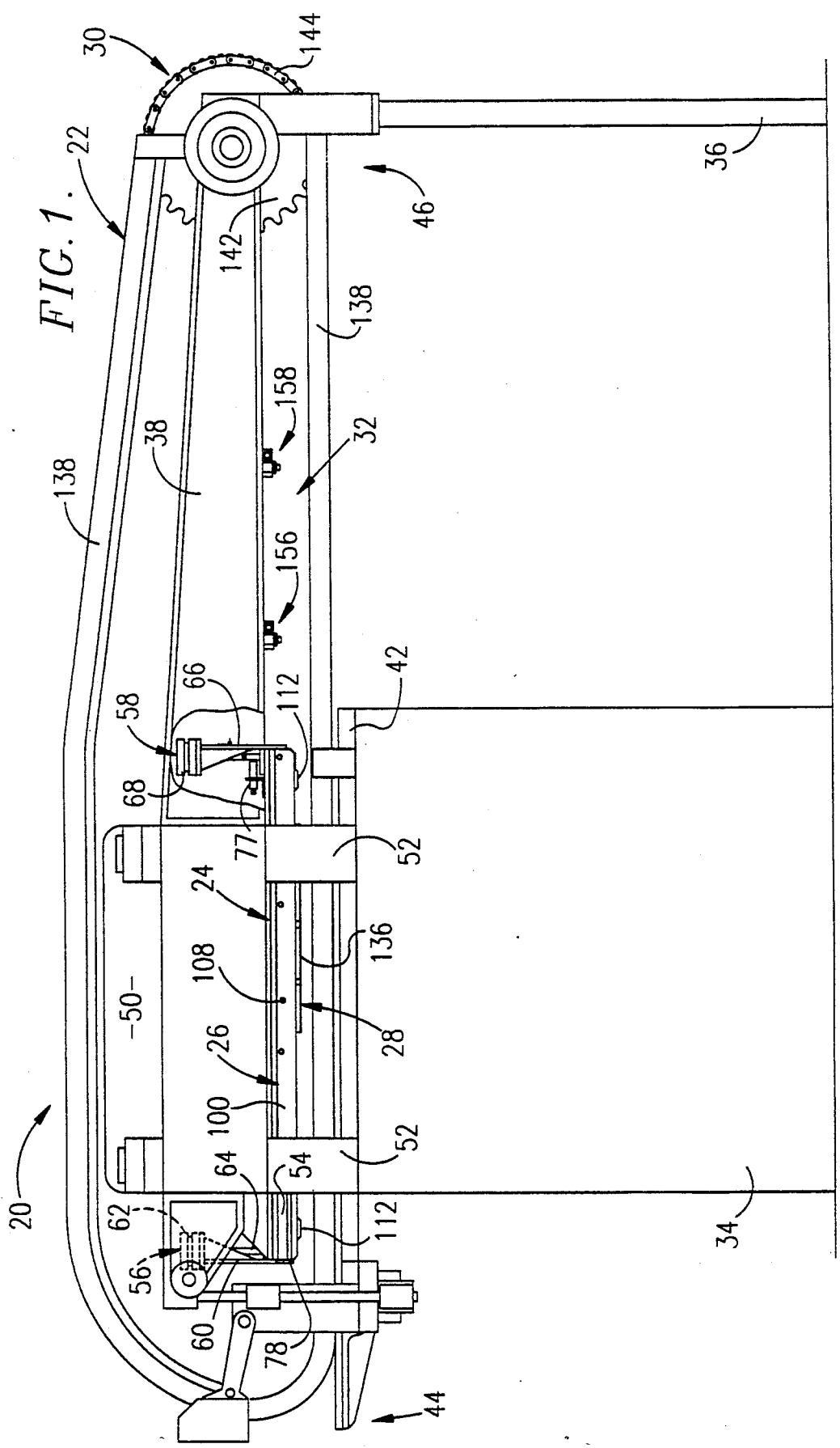

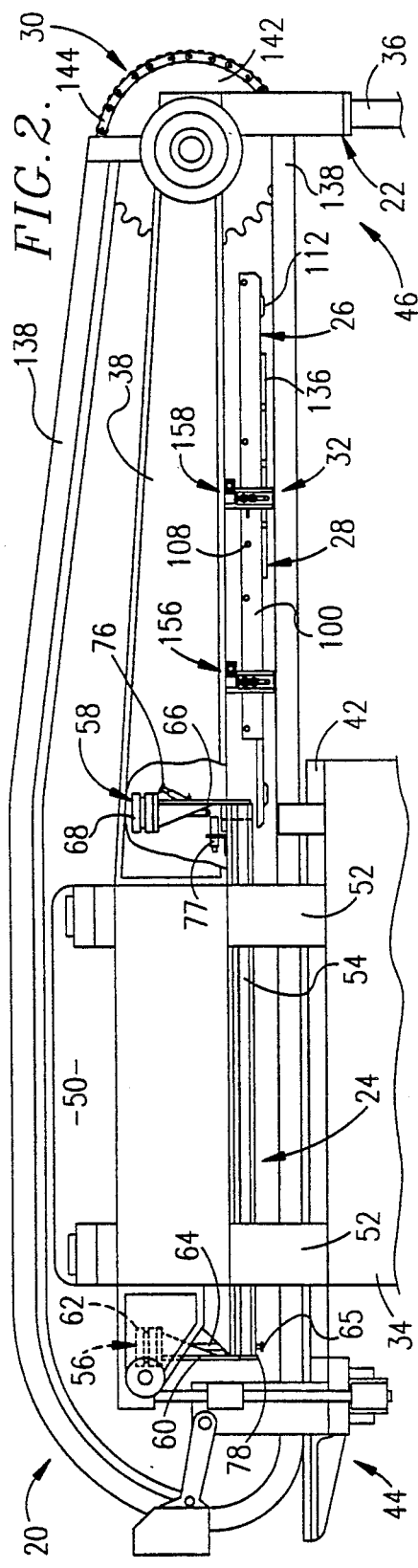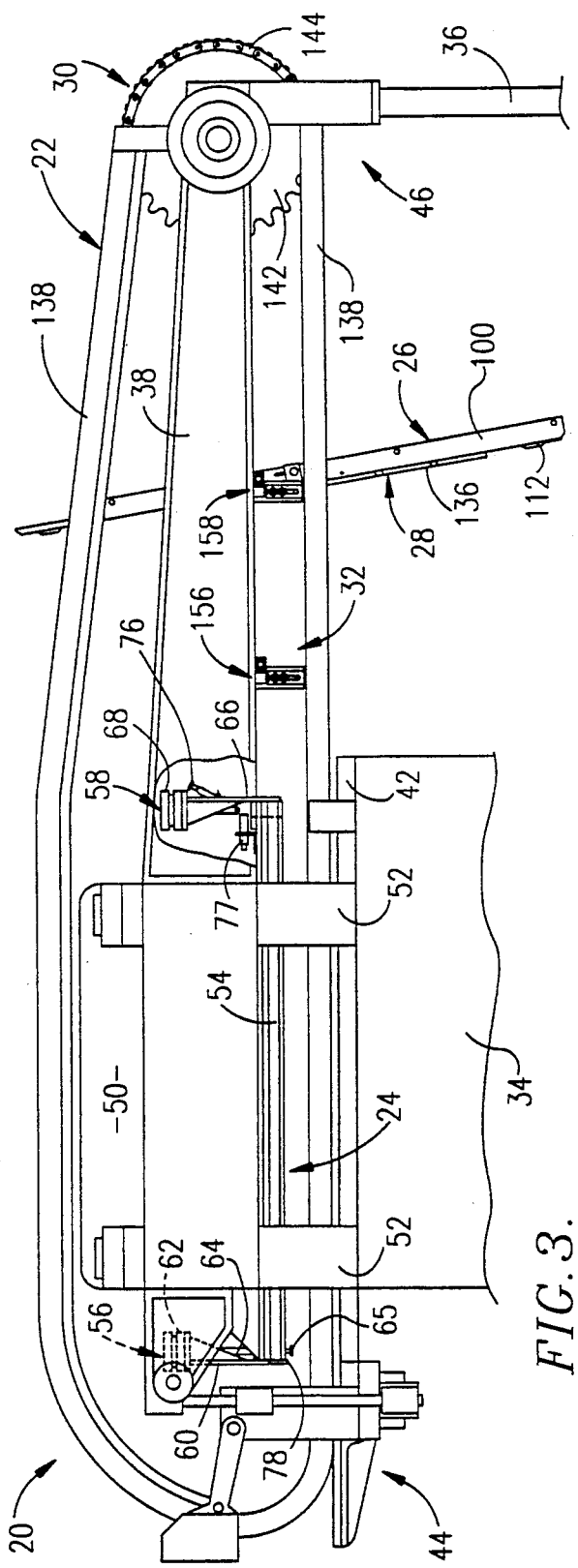

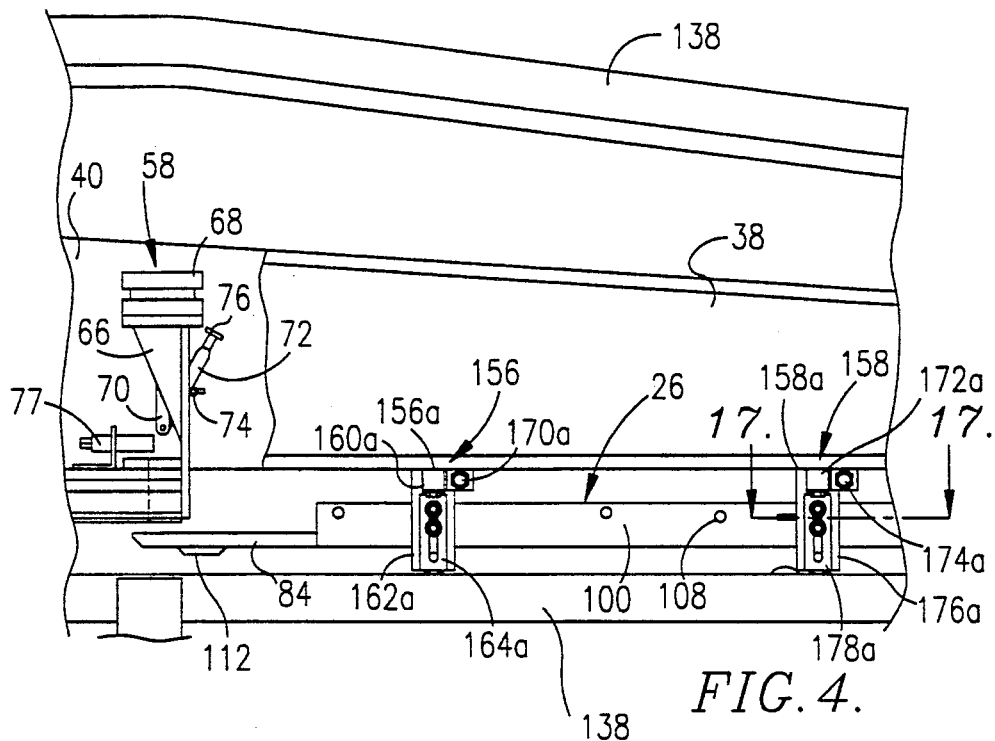
FIG. 4.
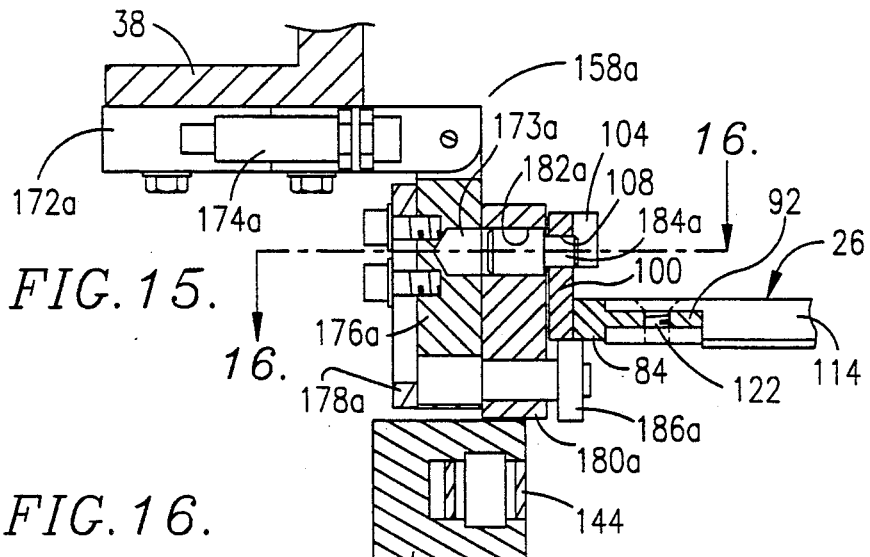
FIG. 15.
FIG. 16.
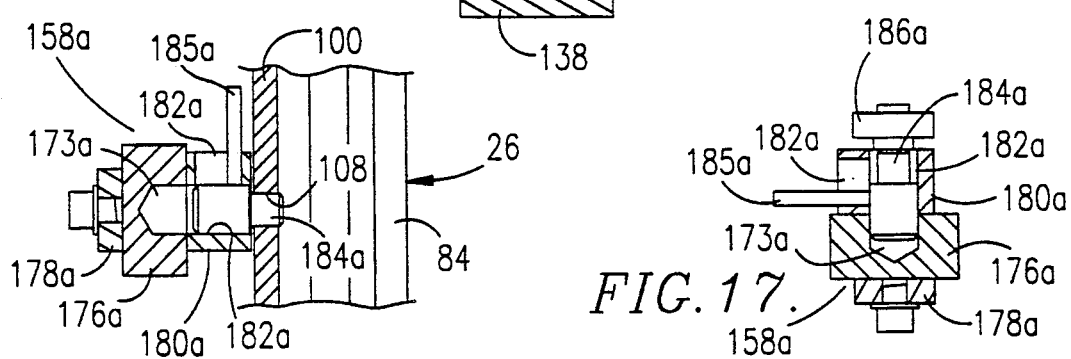
FIG. 17.

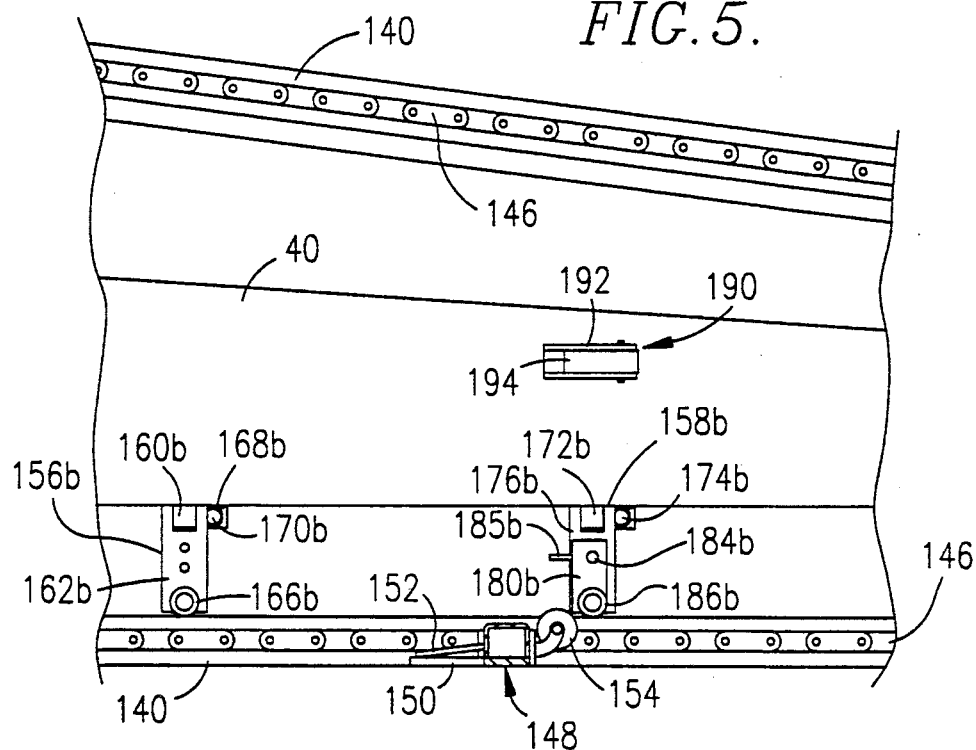
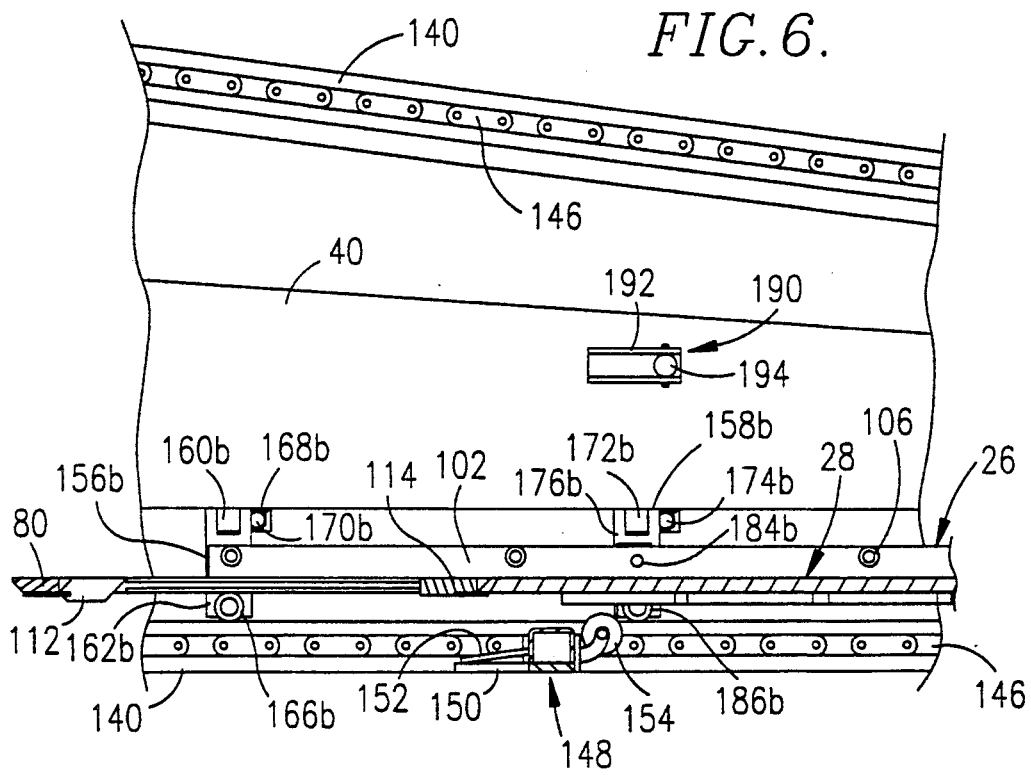

DIE CHANGEOVER APPARATUS FOR BOX BLANK CUTTING MACHINE

BACKGROUND OF THE INVENTION

1. Field of the Invention

The present invention is broadly concerned with an improved blank cutting machine of the type used in box making operations for the die cutting of box blanks. More particularly, it is concerned with such a machine, retrofit apparatus for existing blank cutting machines, and a corresponding method, wherein the die knife structure of the machine may be quickly and easily changed. Advantageously, an otherwise conventional blank cutting machine is equipped with changeover apparatus adjacent the rearward output of the machine which temporarily supports and permits pivoting movement of a die knife frame to an upright position facilitating knife changeover. Use of such changeover apparatus allows replacement of die knife structure in as little as two or three minutes, as compared with existing machines where such changeovers may take forty-five minutes or more.

2. Description of the Prior Art

Box making plants make use of large die cutting machines for the purpose of cutting specially configured box blanks from board stock. Generally speaking, such machines include a vertically reciprocal press member which is adapted to support a die frame, the latter carrying replaceable die knife structure having the desired box blank pattern. Incoming board stock is fed into the forward, input end of the machine and beneath the press member, whereupon the latter is lowered to cut the desired blank. The cut stock is then shifted rearwardly to the output end of the machine where it is deposited onto a conveyor or other pickup apparatus for trimming and stacking.

A significant problem with existing blank cutting machines stems from the time and effort required to change the die knife structure. In typical practice, the machine is shut down, and the die frame released from the press member and shifted rearwardly towards the output end of the machine. At this point an overhead chain hoist is employed to bodily lift the die frame from the machine and transfer it to a changeover table where the actual die changeover is accomplished. After knife replacement, the hoist must again be used to lift the die frame having the replacement die knife structure therein from the table and back into the confines of the machine. Plant workers must then guide the die frame into the machine for attachment to the press member.

This changeover procedure may often take forty-five minutes or longer to complete, and of course during all of this time the machine is inoperable. As can be appreciated, this amount of down time represents a significant loss to the plant operator. This loss is particularly acute where short box runs are made, inasmuch as the die knife structure must be changed after each short run is completed.

There is accordingly a real need in the art for an improved apparatus and method which will materially speed up the die knife changeover operation, thus reducing down time and economic loss.

SUMMARY OF THE INVENTION

The present invention overcomes the problems outlined above and provides an improved blank cutting machine equipped with changeover apparatus allowing die structure changeover in a very short time, and typically on the order of two to three minutes. Broadly speaking, the changeover apparatus of the invention includes means proximal to and in laterally spaced relationship from the press member of a die cutting machine for temporarily supporting a die frame after the latter has been released and shifted relative to the press member, and for permitting selective pivotal movement of the supported die frame to an upright changeover position. In this orientation, the die knife structure carried by the frame can be readily removed and replaced, whereupon the procedure is reversed and the die frame is returned to its operative position within the machine for further use.

In preferred forms, the die changeover apparatus is in the form of two laterally spaced apart pairs of die frame-engaging elements each having a die frame-supporting roller so that, when the die frame is shifted from beneath the press member, it is supported by the wheeled elements. Moreover, the pair of elements remote from the press member each include a selectively extensible pin which are inserted into corresponding pin-receiving apertures provided in the die frame. In this manner, the die frame may be readily pivoted to its upright changeover position. Thus, the knife structure may be readily changed within the confines of the machine itself, and use of an overhead hoist or similar expedient is completely eliminated.

BRIEF DESCRIPTION OF THE DRAWINGS

FIG. 1 is a side elevational view, with parts broken away for clarity, of a blank cutting machine equipped with the changeover apparatus of the present invention;

FIG. 2 is a fragmentary side view similar to that of FIG. 1 but showing the die frame shifted rearwardly and supported by the die frame supports forming a part of the changeover apparatus;

FIG. 3 is a fragmentary side view similar to that of FIG. 2, but showing the die frame in its pivoted upright changeover position;

FIG. 4 is an enlarged, fragmentary side view further depicting the die frame supports during use thereof;

FIG. 5 is a fragmentary vertical sectional view illustrating the inboard construction of the die frame supports and showing the die frame limit stop in its retracted position;

FIG. 6 is a view similar to that of FIG. 5, but showing a die frame supported by the frame supports and with the limit stop extended;

FIG. 15 is a greatly enlarged, fragmentary vertical sectional view of a pivot pin frame support operatively engaging and supporting a die frame;

FIG. 16 is a sectional view taken along line 16—16 of FIG. 15; and

FIG. 17 is a sectional view taken along line 17—17 of FIG. 4.

DESCRIPTION OF THE PREFERRED EMBODIMENT

Figure 7:
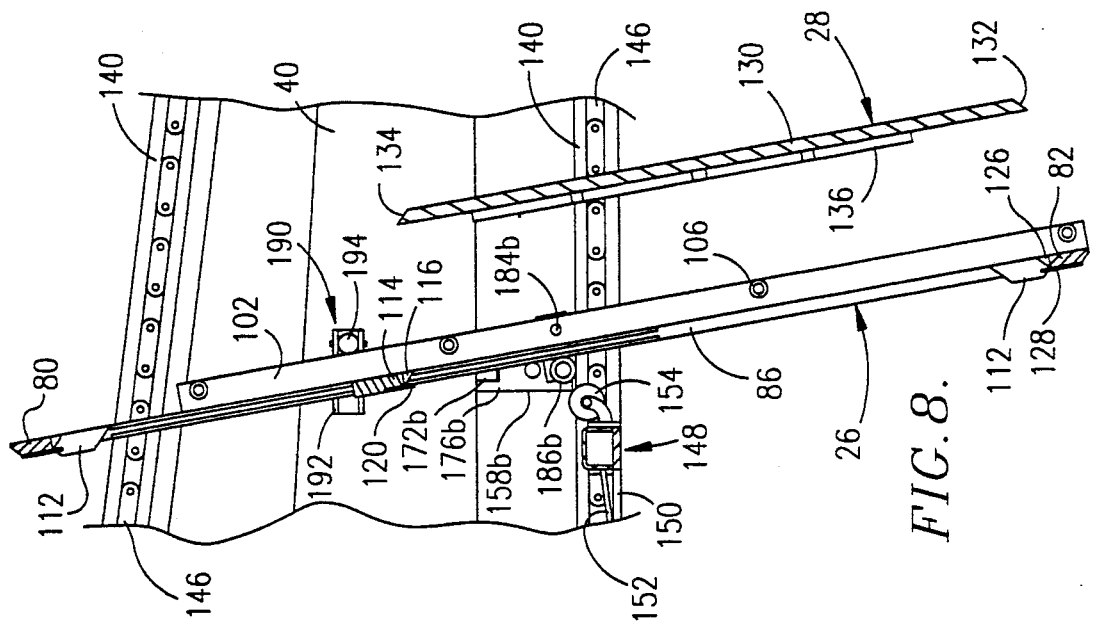
FIG. 7 is a view similar to that of FIGS. 5-6, but illustrating the die frame in its pivoted upright changeover position and engaging the limit stop.

Turning now to the drawings, and particularly FIG. 1, it will be observed that a blank cutting machine 20 broadly includes a frame assembly 22, up and down reciprocal press member 24, die frame 26 supported against the underside of member 24 and carrying die knife structure 28, board stock handling mechanism 30, and changeover apparatus 32 designed to facilitate rapid, easy changeover of the die knife structure 28.

In more detail, the frame assembly 22 includes a forward frame section 34 directly beneath press member 24, as well as rearmost, laterally spaced apart, upright struts 36. A pair of opposed, fore and aft extending, stationary, channel-shaped frame arms 38, 40 extend between frame section 34 and struts 36. In addition, an anvil table 42 is positioned atop frame section 34 and presents an uppermost anvil surface which cooperates with the press member 24 during die cutting operations. The table 42 presents an input end 44 for receipt of incoming board stock to be cut. The output end 46 of the machine rearward of press member 24 and between the struts 36 accommodates a conveyor or other pickup apparatus (not shown) for die cut board stock.

Press member 24 is in the form of a substantially rectangular body 48 situated above anvil table 42. The body 48 is vertically reciprocal by means of a conventional drive assembly mounted within housing module 50, the latter being secured to frame section 34 by means of upright legs 52. The sides of shiftable body 48 are configured to present an elongated, fore and aft extending groove 54, which is important for purposes to be made clear.

The press member 24 also carries a total of four pneumatic piston and cylinder assemblies, arranged in two pairs adjacent the input and output ends of the member respectively. Specifically, a pair of laterally spaced apart input end assemblies 56 are secured to the laterally extending input end margin of member 24, whereas a pair of laterally spaced apart output end assemblies 58 are affixed to the opposed output end margin of member 24. The assemblies 56 are identical and each is supported by an upstanding bracket 60 (see FIG. 1) secured to the input end margin as shown. Each bracket 60 supports at its upper end a conventional pneumatic cylinder 62, with a piston rod 64 extending downwardly. A clamping fixture 65 is secured to the lowermost end of each rod 64 and is adapted to engage the underside of die frame 26. Thus, when the assemblies 56 are activated to pull the respective rods 64 upwardly, the clamping fixtures serve to clamp the forward end of frame 26 against the press member 24.

Figure 10:
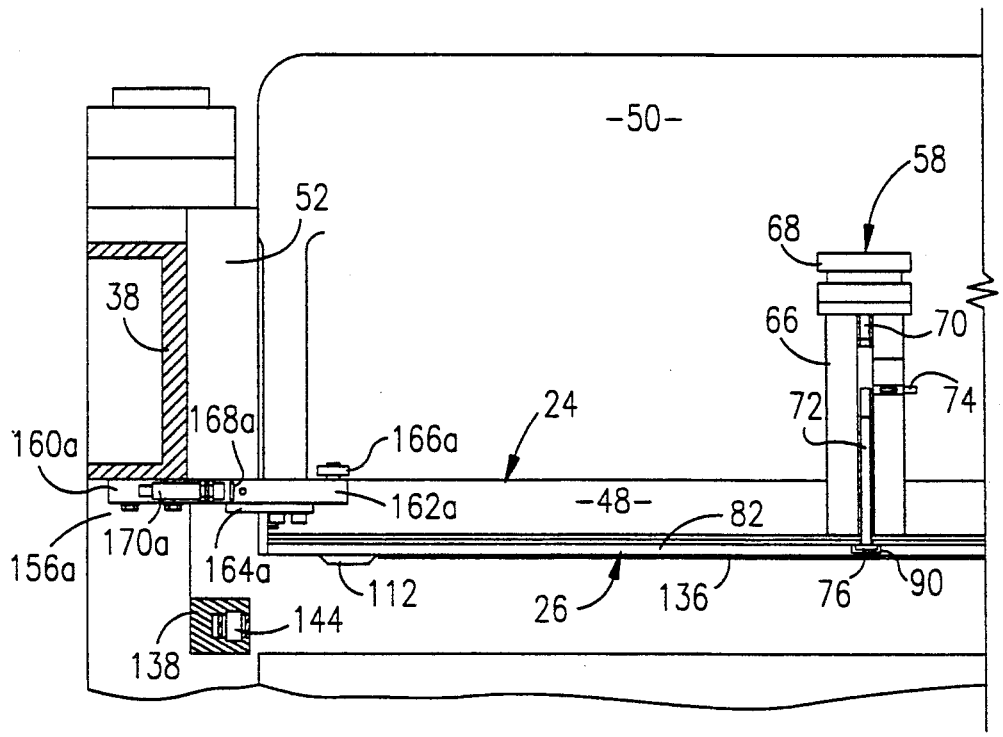
FIG. 10 is a fragmentary vertical sectional view illustrating the output end of the press member of the machine, and with the die frame support in its retracted upper position.
Figure 11:
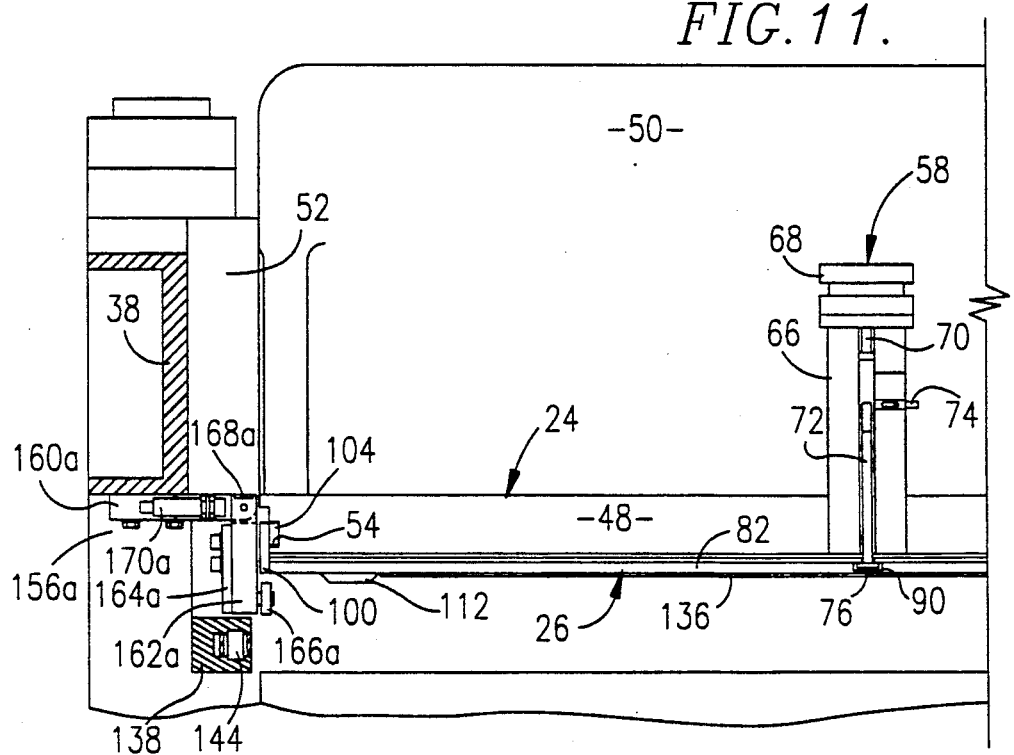
FIG. 11 is a view similar to that of FIG. 10, but showing the frame support in its lowered, use position.
Figure 12:
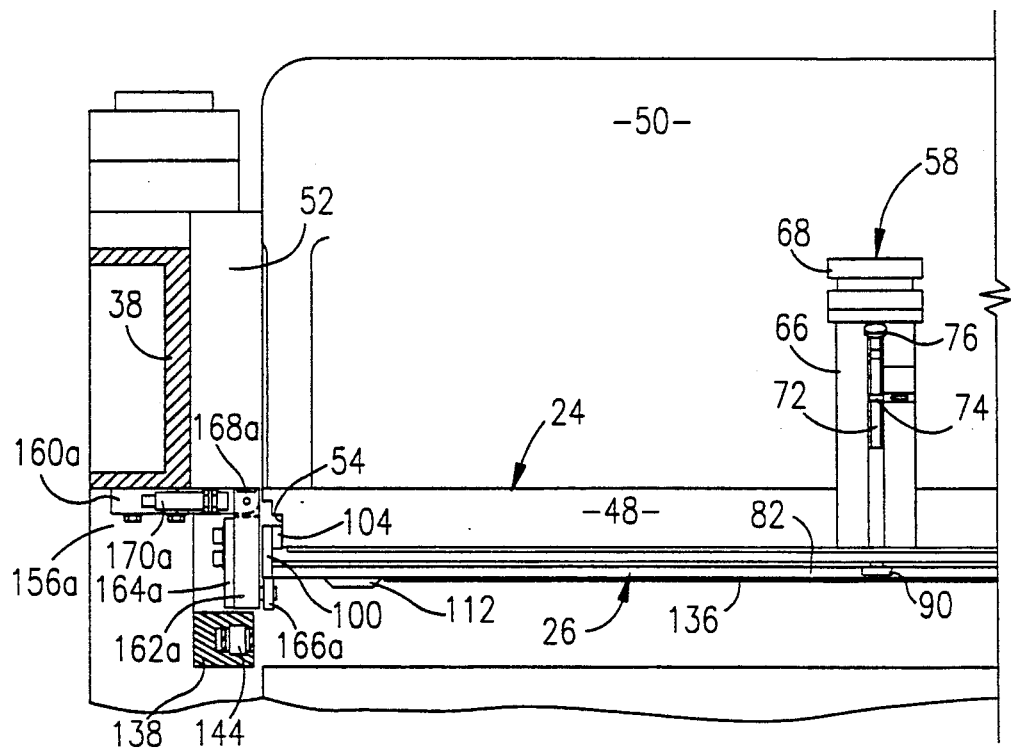
FIG. 12 is a view similar to that of FIG. 10-11, but depicting the frame on the frame support during changeover operations.
Figure 13:
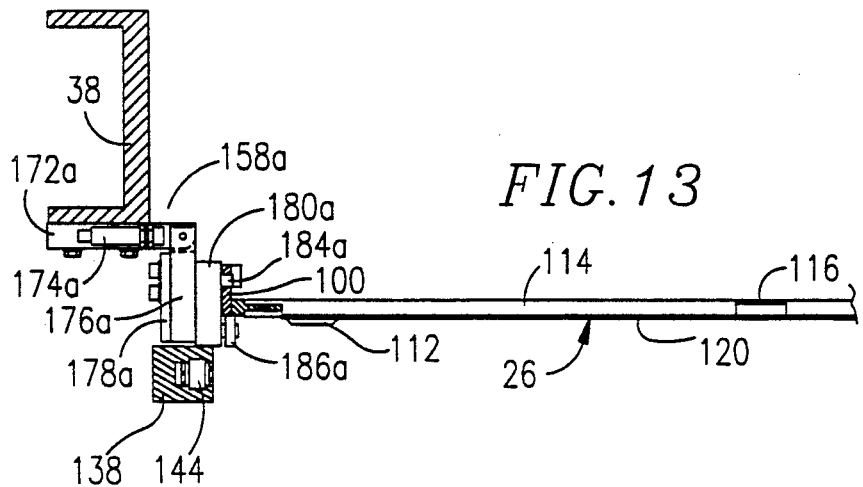
FIG. 13 is a fragmentary vertical sectional view illustrating the construction and function of one of the pivot pin die frame support remote from the output end of the machine press member.

The pneumatic piston and cylinder assemblies 58 are in many respects identical to the assemblies 56. Thus, each of the assemblies 58 is supported by an upstanding bracket 66 (identical to the brackets 60) bolted to the transverse output end margin of the press member 24. A conventional pneumatic cylinder 68 is supported at the upper end of each bracket 66, and has a depending piston rod 70 extending therefrom. A clamping fixture 72 is pivotally connected to the lowermost end of each piston rod 70, so as to permit the fixture 72 to be pivoted upwardly away from die frame 26. In order to selectively hold the fixtures 72 in their upper positions, each of the assemblies 58 is provided with a manually operable, pin-type keeper 74. As best seen in FIGS. 4, 10 and 11, the lowermost ends of the fixtures 76 are provided with a clamping foot 76 designed to engage die frame 26. Thus, when the fixture 72 are in their lowered positions as shown in FIGS. 10 and 11, and the respective cylinders 68 actuated to retract the piston rods 70, the feet 76 operatively engage the output end margin of the die frame 26 and lock the same in contact with the press member 24. Finally, each of the assemblies 58 is equipped with a position sensor 77 (see FIG. 1), which is coupled with the overall control for the machine 20, and prevents machine operation when either of the fixtures 72 is in its upper, retracted position.

Again referring to FIG. 1, it will be observed that the press member 24 is provided with a die frame abutment stop 78 extending laterally across the transverse face of the input end margin of the member 24.

Figure 9:
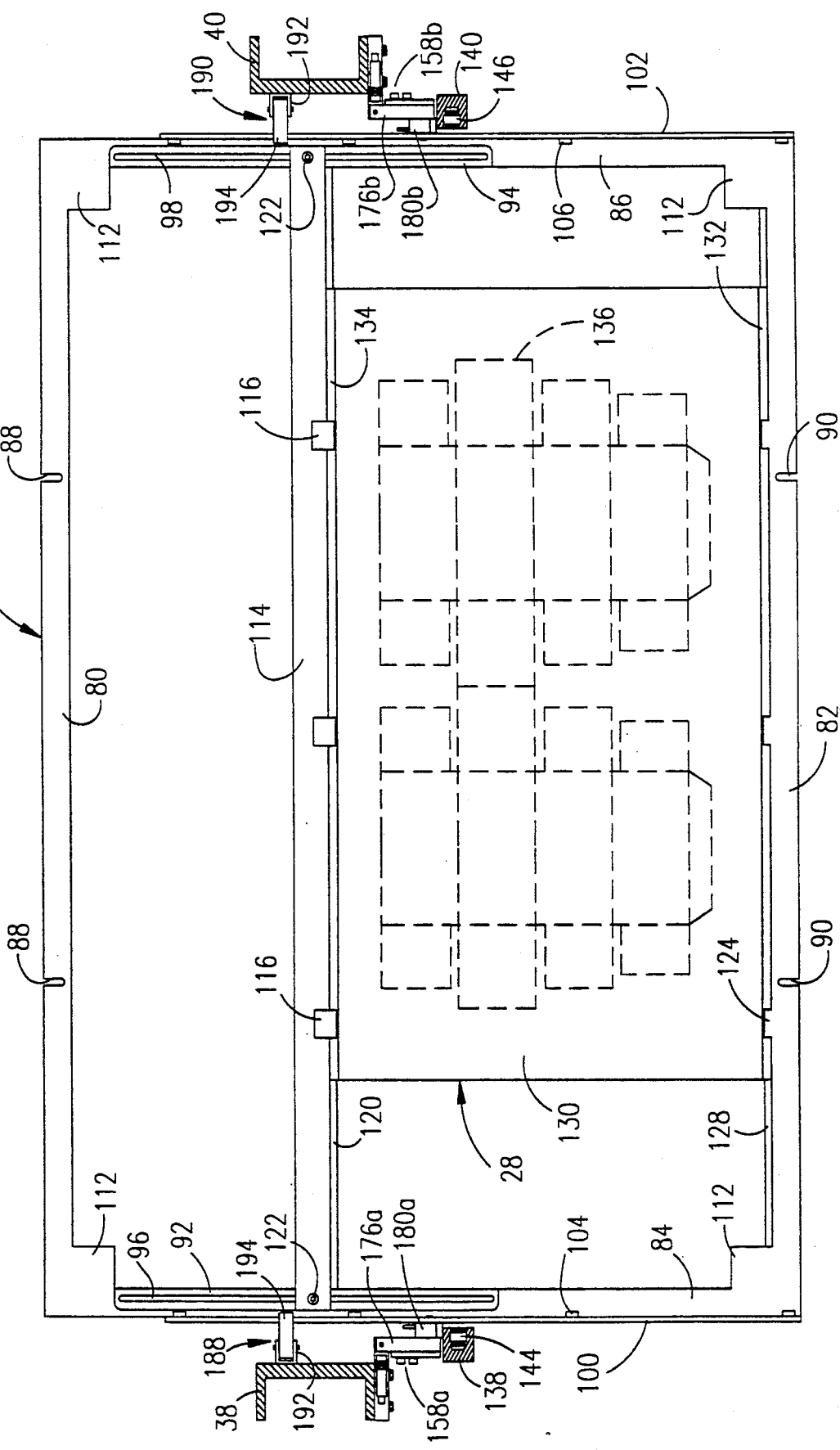
FIG. 9 is a vertical sectional view depicting the die frame in its upright changeover position, and with die knife structure positioned within the frame.

Die frame 26 is best illustrated in FIG. 9. As shown, the frame 26 is of generally rectangular plan configuration and has a transverse input end rail 80, and opposed output end rail 82, and fore and aft extending, laterally spaced apart opposed side rails 84, 86. The rails 80, 82 are provided with connection slots 88, 90 which are located to cooperate with the respective clamping fixtures 65, 72 associated with assemblies 56, 58. The side rails 84, 86 include a reduced thickness, inwardly extending tongue section 92, 94 each provided with a corresponding elongated slot 96, 98. In addition, an upstanding sidewall 100, 102 is affixed to the outer edge of each side rail 84, 86. The sidewalls 100, 102 support a total of four spaced apart rollers 104, 106 which are designed to be received within the corresponding grooves 54 provided in the sidewalls of press member 24. In addition, each of the sidewalls 100, 102 has a pin-receiving aperture 108, 110 therethrough, the purpose of which will be described.

In order to permit placement of the die frame 26 on a table or the like without interference from the die knife structure 28, the corners of die frame 26 are provided with downwardly extending support feet 112.

Figure 14:
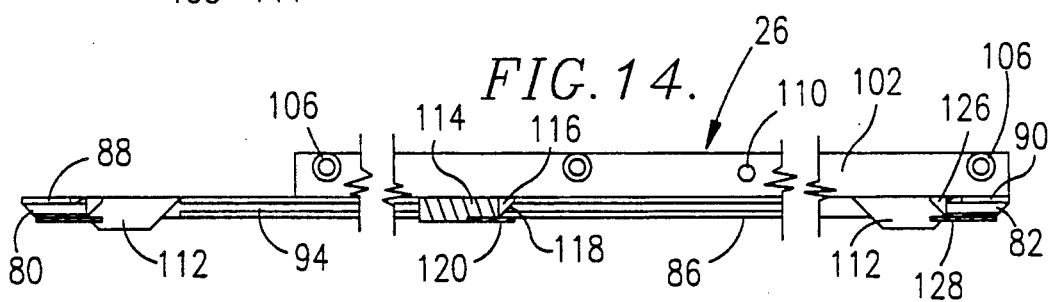
FIG. 14 is a fragmentary vertical sectional view illustrating the construction of the die frame.

A shiftable attachment rail 114 also forms a part of the die frame 26, and extends laterally between the respective side rails 84, 86. The rail 114 is used to secure the die knife structure 28 in place, and for this purpose includes three spaced apart hold down inserts 116, the latter being equipped with a beveled leading edge 118 (see FIG. 14). The rail 114 further includes a transversely extending clamping plate 120 affixed to the underside thereof and extending rearwardly to define an engagement lip. Again referring to FIG. 9, it will be seen that the rail 114 is shiftable in a fore and aft direction and can be selectively positioned along the length of the slotted tongue sections 92, 94. For this purpose, clamping bolts 122 are provided through the ends of the rail 114, which extend through the respective slots 96, 98 and can be tightened to secure the rail 114 in place at any desired position.

The output end rail 82 includes a total of three spaced apart hold down blocks 124 each presenting a beveled innermost surface 126. In addition, this end rail has a forwardly extending support plate 128 defining a lip adapted to support the edge of die knife structure 28 in a manner to be described.

Figure 8:
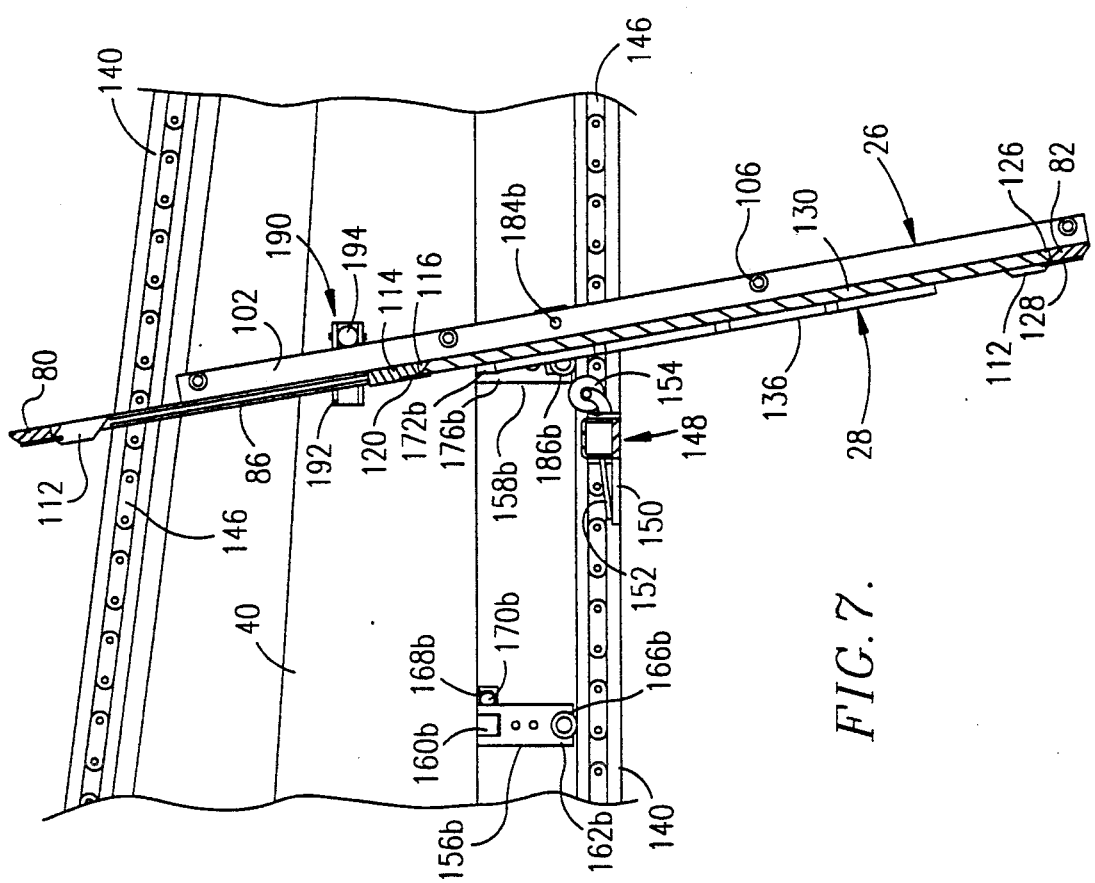
FIG. 8 is a view similar to that of FIG. 7, but showing the die knife structure apart from the die frame.

Die knife structure 28 includes a wooden backing board 130 of generally rectangular configuration. The board 130 presents beveled transverse edges 132, 134 respectively adapted to mate with the inserts 116 of rail 114 and blocks 124 of rail 82. The board 130 further carries a desired pattern of dies 136 arranged to cut a box blank of desired pattern, such as that shown for example in phantom in FIG. 9. As best shown in FIGS. 7-9, the dies 136 are affixed to the underside of backing board 130.

The board stock handling mechanism 30 is essentially conventional and includes a pair of metallic chain guides 138, 140 respectively disposed along the opposite sides of machine 20 and essentially parallel with the respective frame arms 38, 40. As shown, each of the chain guides 138, 140 is generally U-shaped in configuration with the bight of each chain guide being adjacent the input end of machine 20. A chain sprocket 142 is secured to each frame arm 38, 40 and is aligned with an associated chain guide 138, 140. A continuous roller chain 144, 146 is trained around each corresponding sprocket 142 and passes through the aligned chain guide 138 or 140. The sprockets 142 are operatively coupled with an electric motor (not shown) for rotation, so as to move the respective roller chains 144, 146 along the paths of travel defined by the sprockets 142 and the chain guides 138, 140.

Each of the chains 144, 146 carries a plurality board stock grippers 148 (see FIGS. 5-6). Each gripper 148 includes a stationary lowermost finger 150 as well as an upper, opposed spring-loaded gripping finger 152 which is biased to the closed position shown in FIGS. 5 and 6. A cam follower wheel 154 also forms a part of each gripper 148, and is operable to open the associated fingers 152 thereof when a complemental cam is encountered. During movement of the chains 144, 146 along their paths of travel, strategically placed cams (not shown) serve to open the grippers 148, and when these cams are cleared, the grippers then close.

The changeover apparatus 32 includes two pairs of die frame-engaging elements 156 and 158. The first pair 156, consisting of opposed elements 156a and 156b, are situated closest to the output end of press member 24. Each of the elements 156a, 156b includes an upper, horizontally extending attachment block 160a, 160b secured to the underside of the adjacent frame arm 38 or 40. An operating arm 162a, 162b is pivotally secured to the innermost end of each attachment block 160a, 160b, and carries a shiftable, slotted locking plate such as shown at 164a in FIGS. 10-11. Each of the operating arms 162a, 162b also carries an inner, die frame-supporting roller 166a, 166b, and a sensor plate 168a, 168b. A position sensor 170a, 170b is secured to each corresponding block 160a, 160b, and is connected to the operating control system of machine 20.

As best seen in FIGS. 10 and 11, the operating arms 162a, 162b can be selectively moved between a depending, operating position (FIG. 11), and an upper, retracted position (FIG. 10). In the latter position, the associated locking plate is shifted outwardly so as to retain the operating arm 162a or 162b in its upper position. In this upper position, the sensor plates 168a, 168b are in a signal-blocking position relative to the adjacent position sensors 170a, 170b, so that these sensors can determine the positions of the operating arms.

The pair of elements 158, consisting of opposed elements 158a and 158b, are positioned downstream from the elements 156, but are in the same opposed relationship to each other. Each of the elements 158a, 158b (see FIGS. 15-17) includes an uppermost mounting block 172a, 172b affixed to the underside of an associated frame arm 38 or 40, and each carries a position sensor 174a or 174b. An elongated operating arm 176a, 176b is pivotally secured to the inboard end of each block 172a, 172b and carries a slotted locking plate such as the plate 178a depicted in FIG. 15; moreover, each block 172a, 172b is bored in the manner shown at 173a of FIG. 15.

Each operating arm 176a, 176b has a pin block 180a, 180b secured to the inner face thereof. Each pin block 180a, 180b is apertured in the manner shown at 182a in FIGS. 15-17, which aperture is in alignment with the bore of the adjacent operating arm 176a, 176b. Moreover, each pin block 180a, 180b has a transverse slot, such as that shown at 182a in FIGS. 16 and 17. A die frame retention pin 184a, 184b, secured to an enlarged boss, is slidable within the aligned bore and slot structure described previously (e.g., bore 173a and slot 182a) between a retracted positoin depicted in FIG. 17 and the extended position illustrated in FIGS. 15-16. For this purpose, an operating handle 185a, 185b is affixed to the pin structure and extends outwardly through the pin block slot. Finally, a roller 186a, 186b is secured to each block 180a, 180b beneath the pin assemblies thereof. The rollers 186a, 186b are located and designed for supporting the die frame 26 in the manner to be described.

The changeover apparatus 32 also includes a pair of limit stops 188, 190 respectively secured to the inner faces of frame arms 38, 40 (see FIG. 9). Each of the limit stops are identical, and include a channel section 192 affixed to the frame arms, and an elongated rod 194 located between the channel sidewalls and pivoted thereto. As shown in FIG. 5, the rods 194 may be moved to a retracted position generally within the confines of channel section 192, or alternately they may be extended as shown in FIGS. 6 and 9.

OPERATION

During the use of machine 20, a die frame 26, carrying die knife structure 28 of desired configuration, is secured to press member 24 through the medium of the cylinder assemblies 56, 58. The machine operator successively feeds board stock pieces into machine 20 through input end 44. As this is done, the handling mechanism 30 comes into play, i.e., the grippers 148 open and then close to grip the stock piece and pull it into position for die cutting beneath press member 24 and atop anvil table 42. When the stock piece is so oriented, press member 24 is lowered so that the die knife structure 28 cuts the appropriate pattern in the stock piece. At this point, the mechanism 30 again operates to shift the cut stock piece rearwardly for pickup on a conveyor or other similar apparatus positioned adjacent output end 46. During this normal die cutting operation, the changeover apparatus 32 is not used, and the respective elements 156, 158, and limit stops 188, 190 are in their retracted positions.

When it becomes necessary to change the die structure 28, either because a new die cut configuration is desired or because the die is worn, the machine 20 is stopped. Thereupon, the elements 156 and 158 are manipulated to lower the individual operating legs 162a, 162b and 176a, 176b. This is accomplished by loosening the bolts holding the associated locking plates, shifting these locking plates inwardly, and allowing the operating legs to pivot downwardly. When these legs are lowered, the sensors 170a, 170b and 174a, 174b prevent operation of machine 20. Also, the rods 194 of the limit stops 188, 190 are moved to their inwardly extending positions.

The next step involves operation of the pneumatic piston and cylinder assemblies 56, 58 so as to lower the rods 64 and 70 thereof, along with the attached clamping fixtures 65 and 72. This having been accomplished, the fixtures 72 are pivoted upwardly and are retained in place by the keepers 74. The die frame 26 can then be moved rearwardly, this action being facilitated because of the fact that the rollers 104, 106 ride in the side marginal grooves 54 of the press member 24. As the die frame 26 is shifted rearwardly, it first encounters the rollers 166a, 166b of the elements 156, thereby supporting the rearward end of the die frame as it is shifted. Continued rearward shifting of the die frame 26 causes it to engage and be supported by the rollers 186a, 186b of the elements 158 so that, eventually, the die frame 26 completely clears member 24 and is supported entirely by the rollers 166a, 166b and 186a, 186b. At this point, the machine operator adjusts the position of the die frame 26 so that the apertures 108, 110 come into alignment with the pins 184a, 184b. The handles 185a, 185b are then used to extend the pins into the apertures 108, 110 as best seen in FIGS. 15 and 16.

The die frame 26 may then be pivoted in a clockwise direction as viewed in FIGS. 2 and 3 to assume the upright changeover position depicted in FIGS. 7 and 8. As illustrated, the rods 194 limit the pivoting of frame 26. This factor, together with the low center of gravity of the frame 26 by virtue of the position of die structure 28, assures that the die frame 26 is stable in its upright condition.

Die changeover can then proceed by loosening the bolts 122 and lifting attachment rail 114. This allows easy removal of the complete die structure 28, and replacement with another such die structure. The rail 114 can then be lowered into engagement with the backing board 130 of the new die structure, followed by final tightening of the bolts 122.

In order to reinsert the die frame 26 into the machine 20, the above procedure is simply reversed. That is, the die structure 26 is pivoted back to a generally horizontal position in engagement with the element rollers 166a, 166b and 186a, 186b, whereupon the pins 184a, 184b are withdrawn from the die frame apertures 108, 110. This allows the die frame to be shifted forwardly, with the rollers 104, 106 being received within the grooves 54, until the die frame abuts the stop 78 and the fixtures 65 are received within the die frame slots 88. At this point the clamping fixtures 72 are disengaged from the keepers 74 and pivoted downwardly until the fixture rods pass into the die frame slots 90. The pneumatic piston and cylinder assemblies 56, 58 are then actuated to firmly pull the die frame 26 into engagement with the underside of press member 24, thereby rendering the press member ready for die cutting operations.

The final step of the changeover involves moving the operating arms 162a, 162b and 176a, 176b back to their upper retracted positions, and locking these in place via the described locking plates; also, the rods 194 are moved to their retracted positions. In this orientation, the sensors 77, 170a, 170b and 174a, 174b will permit resumption of die cutting operations.

It will thus be appreciated that the present invention represents a distinct improvement over conventional die cutting machines. In practice, die changeovers can be accomplished in as little as two to three minutes, representing a real savings to a box plant operation. It will also be seen that the changeover apparatus of the invention may be designed into new machines, or retrofitted onto existing die cutting machines, with only a minimum of machine modification.

I claim:

1. A method of operating a blank cutting machine and changing die knife structure supported by a die frame in the blank cutting machine, said die frame being releasably secured to a reciprocal press member presenting a forward input end and an opposed, rearward output end, said method comprising the steps of:

positioning successive blanks within the machine in location for engagement by said die knife structure for die cutting of the blanks;

shifting die cut blanks toward and out of said rearward output end, and passing said die cut blanks between a pair of elongated, fore and aft extending frame arms respectively located on opposite sides of said press member and extending rearwardly from said output end;

changing said die knife structure from time to time as needed, including the steps of stopping the blank cutting operation of said die cutting machine;

releasing said die frame from said press member;

shifting said released die frame rearwardly from said press member towards and out of said output end;

temporarily supporting said shifted die frame, and pivoting the die frame to an upright die changeover position;

removing the die knife structure supported by said die frame, and installing a different knife structure in said die frame;

pivoting said die frame back to a position permitting forward shifting thereof under said press member, and shifting the die frame forwardly into said output end and under the press member; and securing said die frame to said press member.

2. A blank cutting machine comprising:

a reciprocal press member presenting a forward input end and an opposed, rearward output end;

a die frame adapted to support die knife structure for cutting of a blank of desired configuration and having a pair of generally parallel, fore and aft extending, spaced apart side rails;

means for releasably securing said frame to said press member;

means for positioning successive blanks within the machine in location for engagement by said die knife structure for die cutting of the blanks, and for shifting die cut blanks toward and out of said output end; and apparatus for facilitating changeover of the die knife structure supported by said die frame, including means located proximal to and in laterally spaced relationship from the rearward output end of said press member for temporarily supporting said die frame after the die frame has been released from and shifted laterally relative to said press member, and for permitting selective pivotal movement of the supported die frame to an upright die changeover position.

said apparatus including a pair of elongated, fore and aft extending frame arms respectively located on opposite sides of said press member and extending rearwardly from said output end, said frame arms having a length greater than the fore and aft length of said die frame side rails, said die frame supporting and pivoting means being carried by said frame arms, said frame arms being spaced apart a sufficient distance to permit passage of said die cut blanks therebetween without interference by the frame arms.

3. The blank cutting machine of claim 2, said die changeover apparatus comprising two laterally spaced apart pairs of die frame-engaging elements, the pair of said elements remote from said press member each including a selectively extensible pin, said die frame including structure defining a pair of opposed, pin-receiving apertures therein for receiving said extensible pins and permitting pivoting movement of the die frame to said upright die changeover position.

4. The blank cutting machine of claim 3, said changeover apparatus further comprising means for limiting the pivoting movement frame and stabilizing the die frame in said upright die changeover position.

5. The blank cutting machine of claim 2, said frame securing means comprising a plurality of pneumatic piston and cylinder assemblies each having a depending, die frame-engaging device and being operable for pulling said die frame into operative engagement with said press member.

6. Apparatus for facilitating the changeover of die knife structure carried by the die frame of a die cutting machine, said machine having a reciprocal press member for releasably supporting said die frame and presenting a forward input end and an opposed, rearward output end, said die frame having a pair of generally parallel, fore and aft extending, spaced apart side rails, said blank cutting machine including means for positioning successive blanks within the machine in location for engagement by said die knife structure for cutting of the blanks, and for shifting die cut blanks toward and out of said output end, said changeover apparatus comprising:

means located proximal to and in laterally spaced relationship from said press member rearward output end for temporarily supporting said die frame after the die frame has been released from and shifted rearwardly relative to said press member, and for permitting pivoting movement of the die frame to an upright die changeover position, said supporting and pivoting means including a pair of elongated, fore and aft extending frame arms respectively located on opposite sides of said press member and extending rearwardly from said output end, said frame arms having a length greater than that of said side rails, said die frame supporting and pivoting means being carried by said frame arms, said frame arms being spaced apart a sufficient distance to permit passage of said die cut blanks therebetween without interference.

7. Apparatus set for in claim 6, said supporting and pivoting means comprising two laterally spaced apart pairs of die frame-engaging elements, the pair of said elements remote from said press member each including a selectively extensible pin, said die frame including structure defining a pair of opposed, pin-receiving apertures therein for receiving said extensible pins and permitting pivoting movement of the die frame to said upright die changeover position.

8. Apparatus as set forth in claim 6, further comprising means for limiting the pivoting movement of said die frame and stabilizing the die frame in said upright die changeover position.

9. Apparatus as set forth in claim 8, said die cutting machine having a machine frame, there being means of operatively securing said die frame-engaging elements and said limiting means to said machine frame.

10. A blank cutting machine, comprising:
a reciprocal press member presenting a forward input end and an opposed, rearward output end;
a die frame adapted to support die knife structure for cutting of a blank of desired configuration;
means for releasably securing said frame to said press member; and
apparatus for facilitating changeover of the die knife structure supported by said die frame, including means located proximal to and in laterally spaced relationship from said press member for temporarily supporting said die frame after the die frame has been released from and shifted laterally relative to said press member, and for permitting selective pivotal movement of the supported die frame to an upright die changeover position,
said changeover apparatus including two laterally spaced apart pairs of die frame-engaging elements, the pair of said elements remote from said press member each including a selectively extensible pin,
said die frame including structure defining a pair of opposed, pin-receiving apertures therein for receiving said extensible pins and permitting pivoting movement of the die frame to said upright die changeover position.

11. Apparatus for facilitating the changeover of die knife structure carried by the die frame of a die cutting machine, said machine having a reciprocal press member for releasably supporting said die frame and presenting a forward input end and an opposed, rearward output end, said changeover apparatus comprising:
means located proximal to and in laterally spaced relationship from said press member output end for temporarily supporting said die frame after the die frame has been released from and shifted rearwardly relative to said press member, and for permitting pivoting movement of the die frame to an upright die changeover position,
said supporting and pivoting means comprising two laterally spaced apart pairs of die frame-engaging elements, the pair of said elements remote from said press member each including a selectively extensible pin,
said die frame including structure defining a pair of opposed, pin-receiving apertures therein for receiving said extensible pins and permitting pivoting movement of the die frame to said upright die changeover position.

* * * * *